United States Patent [19]

Lung-Po

[11] Patent Number: 6,138,711
[45] Date of Patent: Oct. 31, 2000

[54] AIR VALVE FOR AN INFLATABLE DEVICE

[75] Inventor: Tsai Lung-Po, Taipei, Taiwan

[73] Assignee: Ho Lee Co., Ltd., Taipei, Taiwan

[21] Appl. No.: 09/348,863

[22] Filed: Jul. 7, 1999

[51] Int. Cl.[7] .................................................. F16K 15/20
[52] U.S. Cl. ........................ 137/527.8; 137/223; 137/232; 137/855; 446/224
[58] Field of Search .................................. 137/223, 232, 137/527, 855, 522, 523, 527.8; 446/224

[56] References Cited

U.S. PATENT DOCUMENTS

| | | | |
|---|---|---|---|
| 1,136,932 | 4/1915 | Brucker | 446/224 |
| 1,158,206 | 10/1915 | Griffith | 446/224 |
| 2,839,073 | 6/1958 | Marsh | 137/232 |
| 3,646,704 | 3/1972 | Ellsworth | 446/224 |
| 4,004,614 | 1/1977 | Mackal et al. | 137/232 X |
| 5,285,816 | 2/1994 | Herlihy | 137/527.8 X |
| 5,343,889 | 9/1994 | Jaw | 137/232 |

*Primary Examiner*—John Rivell
*Assistant Examiner*—Meredith M. Schenfeld
*Attorney, Agent, or Firm*—Donald C. Casey, Esq.

[57] ABSTRACT

An air valve for an inflatable device, which includes a valve block having two downward locating plates, a valve cap detachably closed on the valve block, and a valve flap fastened to an inside annular flange inside the valve block and turned to close/open the air passage through the valve block, wherein the valve flap has a finger rod raised from a free flap portion thereof for the holding of the hand to turn the free flap portion of the valve flap downwards from a close position to an open position, enabling the free flap portion to be forced through the gap between the locating plates and then stopped at the locating plates in the open position.

1 Claim, 3 Drawing Sheets

AIR VALVE FOR AN INFLATABLE DEVICE

BACKGROUND OF THE INVENTION

The present invention relates to an air valve for an inflatable device, and more particularly to such an air valve that can be retained in a normal open position for letting air be quickly exhausted from the inflatable device in which the air valve is installed.

A regular life buoy, life boat, inflatable toy, or inflatable furniture is equipped with an air valve through which air is driven into the inside of the inflatable device by an air compressor, a foot pump, or a hand pump. An air valve for this purpose is generally molded from plastics and then fastened to an inflatable device by a high frequency sealing apparatus, comprising a valve block defining an air passage, an one-way valve flap connected to the valve block on the inside to close/open the air passage, a valve plug for plugging into the valve block to stop the air passage, and a flexible connecting rod connected between the valve plug and the outside wall of the valve block. This structure of air valve has drawbacks. When exhausting air from the inflatable device, the valve plug must be disengaged from the valve block, and the valve block must be deformed to open the valve flap from the air passage. During exhausting of air, the valve block must be maintained in the deformed manner to hold the valve flap in the open position. If the valve flap is made detachable, the valve flap must be removed from the valve block before exhausting air from the air valve. Furthermore, frequently plugging the valve plug into the valve block causes the valve block to wear quickly. When the valve block starts to wear, an air leakage may occur.

SUMMARY OF THE INVENTION

The present invention has been accomplished to provide an air valve, which eliminates the aforesaid drawbacks. According to one aspect of the present invention, the An air valve comprises a valve block defining an air passage, a valve cap detachably fastened to the valve block by a screw joint, and a valve flap fastened to the valve block on the inside to close/open the air passage. According to another aspect of the present invention, the valve block comprises two downward locating plates, the valve flap has a finger rod raised from a free flap portion thereof for the holding of the hand to turn the free flap portion of the valve flap downwards from a close position to an open position, enabling the free flap portion to be forced through the gap between the locating plates and then stopped at the locating plates in the open position.

DETAILED DESCRIPTION OF THE PREFERRED EMBODIMENT

Figure 1:
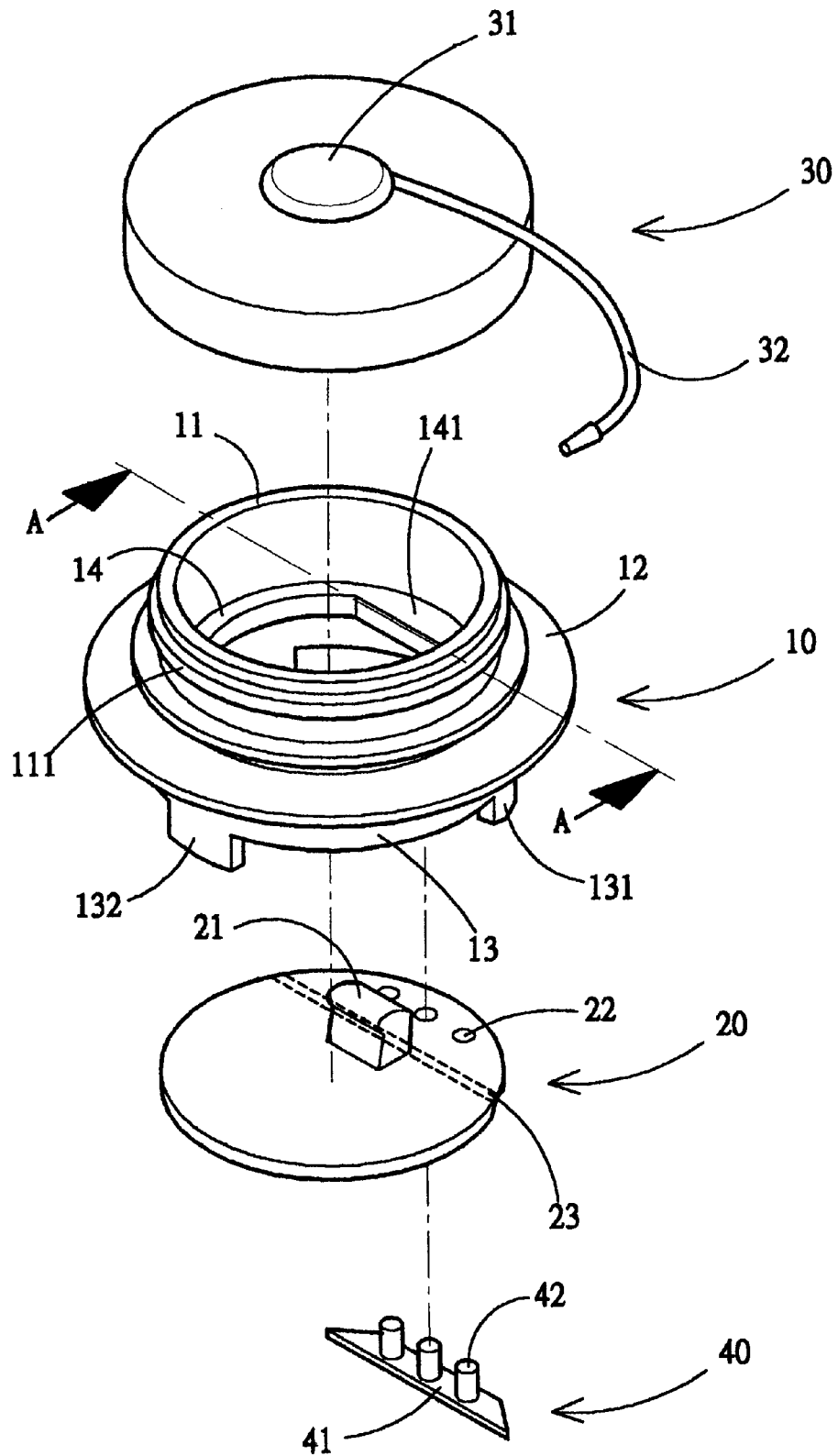
FIG. 1 is an exploded view of an air valve according to the present invention.

Referring to FIG. 1, an air valve in accordance with the present invention is shown comprised of a valve block 10, a valve flap 20, a valve cap 30, and a fastening device 40.

Figure 2:
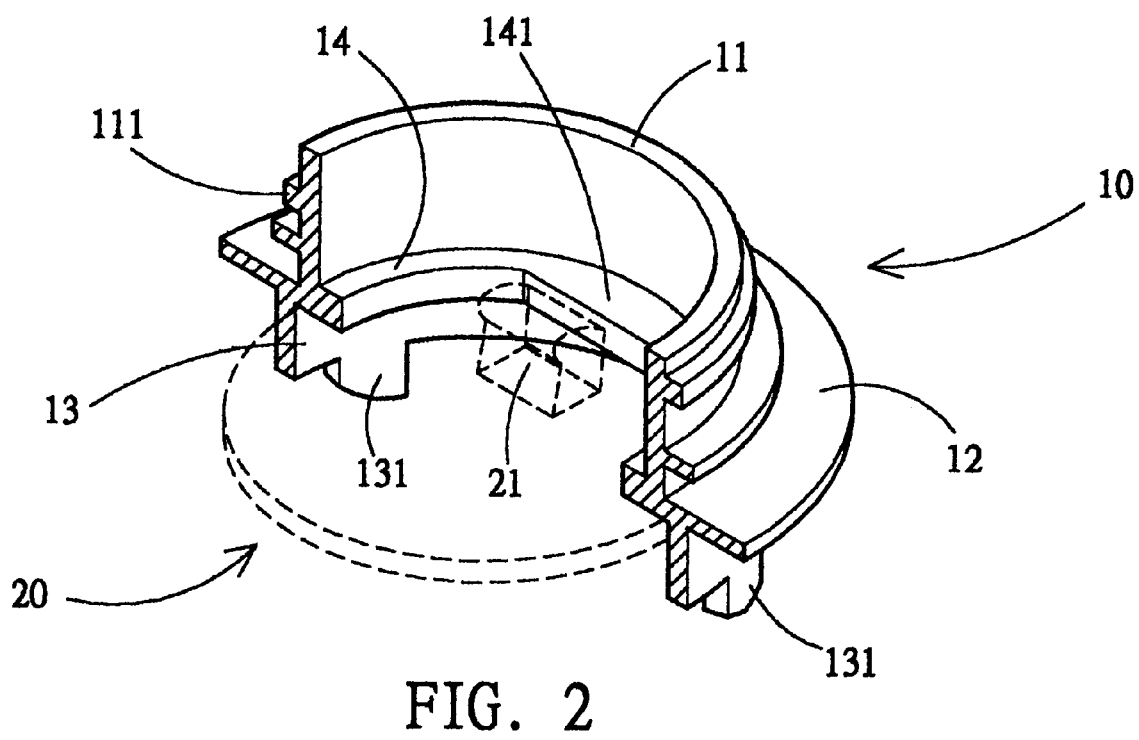
FIG. 2 is an elevational view in section taken along line A—A of FIG. 1.

Referring to FIG. 2 and FIG. I again, the valve block 10 comprises a short, cylindrical, hollow body formed of a hollow cylindrical upper body portion 11 and a hollow cylindrical lower body portion 13, an outward mounting flange 12 raised around the outside wall of the short cylindrical body on the middle between the upper body portion 11 and the lower body portion 13 for fastening to the outside wall of an inflatable device by a high-frequency sealing apparatus, an inside annular flange 14 raised around the inside wall of the short cylindrical body between the upper body portion 11 and the lower body portion 13, a positioning portion 141 formed in integrity with the inside annular flange 14, a plurality of recessed plug holes (not shown) aligned at the positioning portion 141 at the bottom side, an outer thread 111 formed on the outside wall of the upper body portion 11 for the mounting of the valve cap 30, a stop plate 132 and two locating plates 131 downwardly extended from the lower body portion 13. The valve cap 30 is a screw cap threaded onto the outer thread 111 to close the valve block 10, having a connecting portion 31 raised from the top side wall thereof at the top, and an elongated, flexible connecting element 32 extended from the connecting portion 31 and connected to a part of the valve block 10. The valve flap 20 is a rubber flap mounted within the lower body portion 13 below the inside annular flange 14, having a folding groove 23, which divides the valve flap 20 into a fixed flap portion and a free flap portion, a plurality of mounting through holes 22 aligned at the fixed flap portion and fastened to the positioning portion 141 inside the valve block 10 by the fastening device 40, and a finger rod 21 raised from the free flap portion. The finger rod 21 is suspended in the upper body portion 11 of the valve block 10 when the valve flap 20 is closed. The fastening device 40 comprises a flat base 41 closely attached to the bottom side wall of the fixed flap portion of the valve flap 20, a plurality of plug rods 42 raised from the flat base 41 and inserted through the mounting through holes 22 at the fixed flap portion of the valve flap 20 and plugged into the recessed plug holes at the positioning portion 141 of the valve block 10. After installation, the free flap portion of the valve flap 20 can be turned up and down relative to the fixed flap portion of the valve flap 20 between two positions, namely, the close position and the open position to close/open the passage through the valve block 10.

Figure 3:
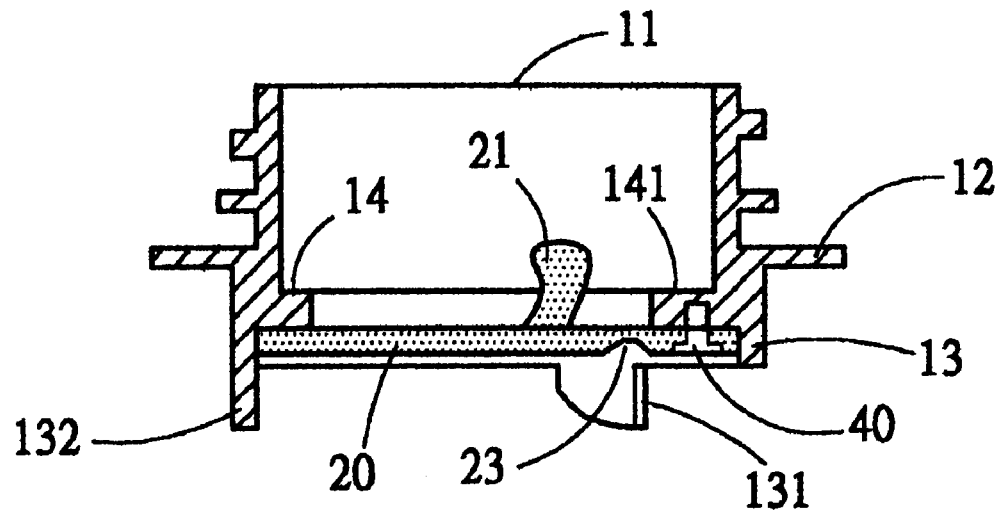
FIG. 3 is a side view in section of the present invention, showing the valve flap closed.
Figure 4:
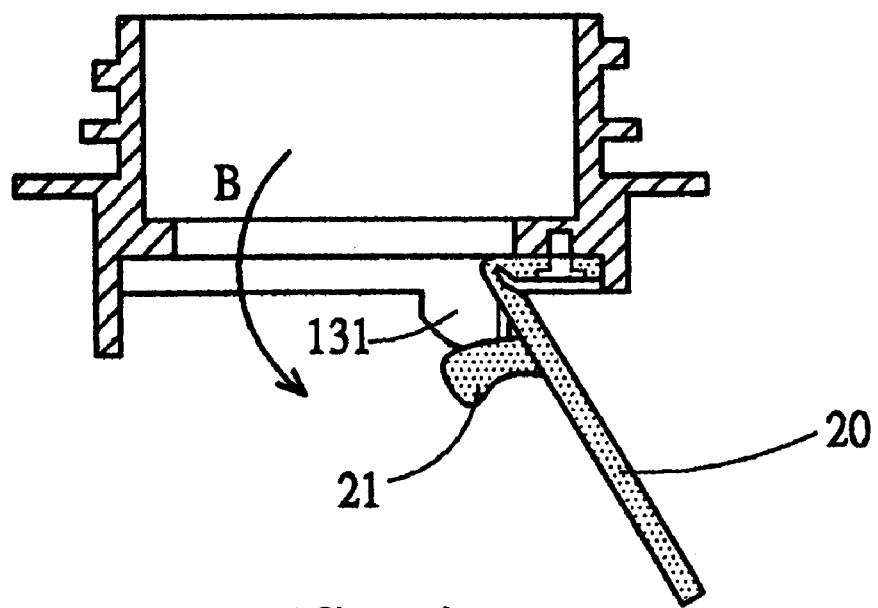
FIG. 4 is similar to FIG. 3 but showing the valve flap opened.

Referring to FIGS. 3 and 4 and FIG. 2 again, the valve flap 20 is fixedly fastened to the positioning portion 141 at the bottom side within the lower body portion 13 of the valve block 10, the locating plates 131 are disposed adjacent to the positioning portion 141 (see FIG. 3). When compressed air is driven into the valve block 10, the free flap portion of the valve flap 20 is forced by compressed air and turned downwardly inwards to the open position for letting compressed air pass through the lower body portion 13 of the valve block 10 to the inside of the inflatable device in which the air valve is installed (see FIG. 4). When intake flow of compressed air is stopped, the free flap portion of the valve flap 20 is immediately forced upwards by the inside air pressure of the inflatable device to the close position to close the air passage through the valve block 10 (see FIG. 3). For quick release of air from the inflatable device, the finger rod 21 is pushed inwards with the fingers to open the valve flap 20. When the free flap portion of the valve flap 20 is turned downwards in direction B (see FIG. 4), it is forced to deform and to pass through the gap between the locating plates 131 (the pitch between the locating plates 131 is shorter than the diameter of the valve flap 20). After having passed through the gap between the locating plates 131, the free flap portion of the valve flap 20 immediately returns to its former shape and stopped at the locating plates 131, i.e., the valve flap 20 is retained in the open position for letting air be quickly exhausted from the inflatable device. After exhaust of inside air from the inflatable device, the finger rod 21 is pulled with fingers to return the free flap portion of the valve flap 20 to the close position. Further, the stop plate 132 stops solid objects from entering the air passage in the lower body portion 13 of the valve block 10.

While only one embodiment of the present invention has been shown and described, it will be understood that various modifications and changes could be made thereunto without departing from the spirit and scope of the invention disclosed.

What the invention claimed is:

1. An air valve for an inflatable device comprising:

a hollow cylindrical valve block fastened to an inflatable device and defining an air passage for letting air to pass in and out of said inflatable device, said valve block comprising a hollow cylindrical body formed of an upper body portion and a hollow cylindrical lower body portion, an outward mounting flange raised around said hollow cylindrical body on the outside between the said upper body portion and said lower body portion and fixedly fastened to said inflatable device, an inside annular flange raised around an inside wall of said hollow cylindrical body between said upper body portion and said lower body portion, a positioning portion formed in integrity with said inside annular flange, a plurality of recessed plug holes aligned at said positioning portion at a bottom side, an outer thread formed on said upper body portion, two locating plates downwardly extended from said lower body portion at two opposite sides of said positioning portion, and a stop plate downwardly extended from said lower body portion;

a valve cap threaded onto the outer thread at said upper body portion to close said valve block;

a rubber valve flap fastened to said valve block and stopped below the inside annular flange of said valve block within said lower body portion and turned to close/open the air passage through said valve block, said rubber valve flap comprising a fixed flap portion fastened to the positioning portion inside said valve block, a free flap portion turned relative to said fixed flap portion between a first position where said valve flap closes the air passage through said valve block, and a second position where said valve flap is opened from the air passage through said valve block, a folding groove between said fixed flap portion and said free flap portion, a plurality of mounting through holes aligned at said fixed flap portion, and a finger rod raised from said free flap portion in direction from said lower body portion toward said upper body portion; and a fastening device fastened to the positioning portion of said valve block to fix said valve flap in place, said fastening device comprising a flat base closely attached to the fixed flap portion of said valve flap at a bottom side, a plurality of plug rods raised from said flat base and inserted through the mounting through holes at said fixed flap portion of said valve flap and plugged into the recessed plug holes at said positioning portion of said valve block;

wherein said finger rod can be pushed with fingers to turn said free flap portion of said valve flap downwards to said second position, enabling said free flap portion to be forced through the gap between said locating plates and then stopped at said locating plates in said second position.

\* \* \* \* \*